United States Patent
Oniwa

(10) Patent No.: US 11,242,055 B2
(45) Date of Patent: Feb. 8, 2022

(54) VEHICLE CONTROL SYSTEM AND VEHICLE CONTROL METHOD

(71) Applicant: HONDA MOTOR CO., LTD., Tokyo (JP)

(72) Inventor: Yoshihiro Oniwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 845 days.

(21) Appl. No.: 15/990,906

(22) Filed: May 29, 2018

(65) Prior Publication Data

US 2018/0345967 A1 Dec. 6, 2018

(30) Foreign Application Priority Data

Jun. 2, 2017 (JP) .............................. JP2017-110184

(51) Int. Cl.
*B60W 30/16* (2020.01)
*B60W 50/14* (2020.01)
(Continued)

(52) U.S. Cl.
CPC ........... *B60W 30/162* (2013.01); *B60K 28/02* (2013.01); *B60T 7/22* (2013.01); *B60T 8/17* (2013.01);
(Continued)

(58) Field of Classification Search
None
See application file for complete search history.

(56) References Cited

U.S. PATENT DOCUMENTS 6,163,741 A * 12/2000 Matsuda ............ B60K 31/0066
701/1
8,742,936 B2 * 6/2014 Galley ................... G08B 21/06
340/576
(Continued)

FOREIGN PATENT DOCUMENTS

CN          104724091       6/2015
JP            2003-118423     4/2003
(Continued)

OTHER PUBLICATIONS

Japanese Office Action for Japanese Patent Application No. 2017-110184 dated Sep. 11, 2018.
(Continued)

*Primary Examiner* — Todd Melton
*Assistant Examiner* — Jason R Roberson
(74) *Attorney, Agent, or Firm* — Amin, Turocy & Watson, LLP

(57) ABSTRACT

A vehicle control system includes an acquirer that acquires environmental information including information of a reference speed preset on a scheduled route on which an own-vehicle travels and a travel controller that performs speed control and steering control of the own-vehicle on the basis of the environmental information acquired by the acquirer. The travel controller performs the speed control with the reference speed as a target speed of the own-vehicle if a control index value regarding the steering control is equal to or less than an upper limit value when the own-vehicle travels on the scheduled route at the reference speed and performs the speed control with a speed at which the control index value regarding the steering control is equal to or less than the upper limit value as the target speed of the own-vehicle if the control index value exceeds the upper limit value.

9 Claims, 11 Drawing Sheets

(51) Int. Cl.
*B60K 28/02* (2006.01)
*G08G 1/16* (2006.01)
*G01S 13/86* (2006.01)
*B60T 8/17* (2006.01)
*B60T 7/22* (2006.01)
*G01S 13/931* (2020.01)
*B60T 8/1755* (2006.01)
*G01S 13/34* (2006.01)
*B60K 31/08* (2006.01)
*B60T 7/12* (2006.01)

(52) U.S. Cl.
CPC ......... *B60T 8/17557* (2013.01); *B60W 50/14* (2013.01); *G01S 13/34* (2013.01); *G01S 13/865* (2013.01); *G01S 13/931* (2013.01); *G08G 1/16* (2013.01); *B60K 31/08* (2013.01); *B60T 7/12* (2013.01); *B60T 2201/087* (2013.01); *B60T 2201/16* (2013.01); *G01S 2013/9318* (2020.01)

(56) References Cited

U.S. PATENT DOCUMENTS

| | | | |
|---|---|---|---|
| 9,047,780 B2 * | 6/2015 | Guarnizo Martinez | G08G 1/16 |
| 2009/0187322 A1 * | 7/2009 | Yasui | B60W 40/072 |
| | | | 701/70 |
| 2011/0060505 A1 * | 3/2011 | Suzuki | B60W 30/18009 |
| | | | 701/42 |
| 2012/0253628 A1 * | 10/2012 | Maruyama | B60K 31/18 |
| | | | 701/93 |
| 2013/0197762 A1 * | 8/2013 | Schuberth | B60W 10/20 |
| | | | 701/42 |
| 2013/0289874 A1 * | 10/2013 | Taguchi | B60W 30/146 |
| | | | 701/533 |
| 2014/0300479 A1 | 10/2014 | Wolter et al. | |
| 2016/0257304 A1 * | 9/2016 | Lavoie | B60W 30/06 |
| 2016/0318513 A1 * | 11/2016 | Lee | B60W 50/14 |
| 2017/0235311 A1 * | 8/2017 | Sekijima | B60W 50/14 |
| | | | 701/25 |
| 2018/0203461 A1 * | 7/2018 | Yokokawa | G06K 9/00798 |

FOREIGN PATENT DOCUMENTS

| | | |
|---|---|---|
| JP | 2005-173909 | 6/2005 |
| JP | 2007-528815 | 10/2007 |
| JP | 2013-039891 | 2/2013 |
| JP | 2015-138330 | 7/2015 |
| JP | 2016-132351 | 7/2016 |
| JP | 2016-207064 | 12/2016 |
| JP | 2017-043171 | 3/2017 |
| JP | 2018-097763 | 6/2018 |
| KR | 10-2015-0124527 | 11/2015 |
| WO | 2016/047063 | 3/2016 |

OTHER PUBLICATIONS

Japanese Office Action for Japanese Patent Application No. 2017-110184 dated Jan. 29, 2019.
Chinese Office Action for Chinese Patent Application No. 201810528470.3 dated Jan. 5, 2021.

* cited by examiner

FIG. 7

| CURVATURE<br>REFERENCE SPEED | 0[%] | 10[%] | 20[%] | 30[%] | 40[%] | ... |
|---|---|---|---|---|---|---|
| 10[km/h] | 0° | 1° | 2° | 4° | 8° | ... |
| 20[km/h] | 0° | 2° | 4° | 8° | 16° | ... |
| 30[km/h] | 0° | 3° | 6° | 12° | 24° | ... |
| 40[km/h] | 0° | 4° | 8° | 16° | 32° | ... |
| 50[km/h] | 0° | 5° | 10° | 20° | 40° | ... |
| 60[km/h] | 0° | 6° | 12° | 24° | 48° | ... |
| 70[km/h] | 0° | 7° | 14° | 28° | 56° | ... |
| ... | ... | ... | ... | ... | ... | ... |

FIG. 10

THE CURVE IS STEEP HERE.
PLEASE WATCH
THE DIRECTION OF TRAVEL.

FIG. 11

THE CURVE IS STEEP HERE.
PLEASE HOLD
THE STEERING WHEEL.

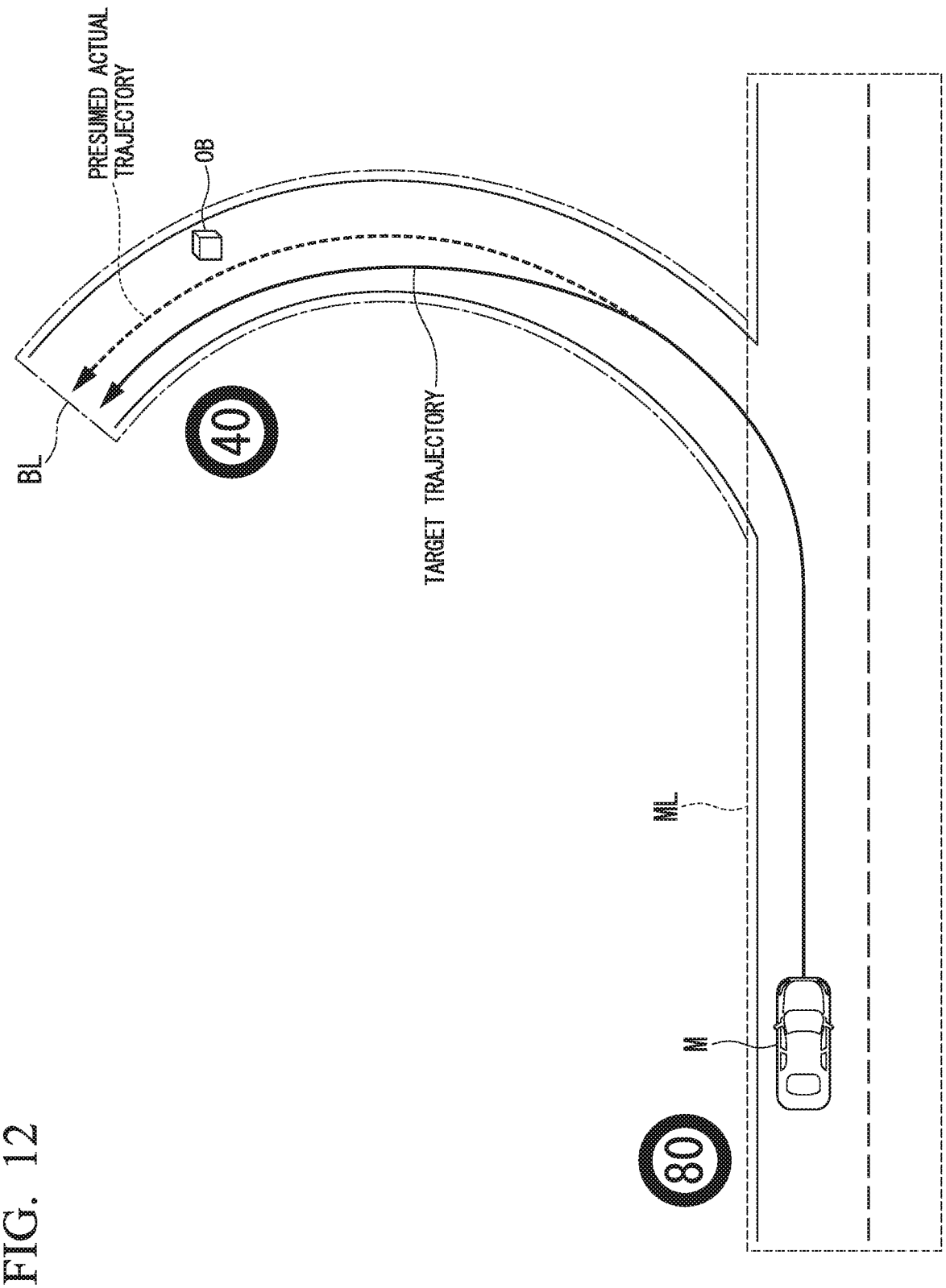

VEHICLE CONTROL SYSTEM AND VEHICLE CONTROL METHOD

CROSS-REFERENCE TO RELATED APPLICATION

This application is based upon and claims the benefit of priority from Japanese Patent Application No. 2017-110184, filed on Jun. 2, 2017, the entire contents of which are incorporated herein by reference.

BACKGROUND

Field of the Invention

The present invention relates to a vehicle control system and a vehicle control method.

Description of Related Art

A technology in which a reaction of a driver is detected during automated driving during which traveling of a vehicle is automatically controlled while changing the vehicle speed in a timely manner and, when a reaction of the driver is not detected for a predetermined period of time, a warning is issued to the driver and the automatic travel control is stopped is known in the related art (for example, see Japanese Unexamined Patent Application, First Publication No. 2013-39891).

SUMMARY

However, in the technology of the related art, control of the vehicle speed during automated driving is inappropriate in some cases.

Aspects of the present invention have been made in view of the above circumstances and it is an object of the present invention to provide a vehicle control system and a vehicle control method which can appropriately control the vehicle speed.

A vehicle control system and a vehicle control method according to the present invention adopt the following configurations.

(1) An aspect of the present invention provides a vehicle control system including an acquirer configured to acquire environmental information including information of a reference speed preset on a scheduled route on which an own-vehicle travels, and a travel controller configured to perform speed control and steering control of the own-vehicle on the basis of the environmental information acquired by the acquirer, wherein the travel controller is configured to perform the speed control with the reference speed as a target speed of the own-vehicle if a control index value regarding the steering control is equal to or less than an upper limit value when the own-vehicle travels on the scheduled route at the reference speed and to perform the speed control with a speed at which the control index value regarding the steering control is equal to or less than the upper limit value as the target speed of the own-vehicle if the control index value exceeds the upper limit value.

(2) In the vehicle control system according to the above aspect (1), the acquirer is configured to acquire information regarding a curvature of the scheduled route as the environmental information, and the travel controller is configured to perform the speed control with the target speed that decreases as the curvature of the scheduled route indicated by the information acquired by the acquirer increases if the control index value regarding the steering control exceeds the upper limit value.

(3) The vehicle control system according to the above aspect (1) or (2) further includes a monitor configured to monitor an occupant of the own-vehicle, wherein the travel controller is configured to perform, if the control index value exceeds the upper limit value, the speed control with the target speed which is lower when a monitoring result of the monitor indicates that the occupant is not monitoring surroundings of the own-vehicle than when the monitoring result indicates that the occupant is monitoring surroundings of the own-vehicle.

(4) In the vehicle control system according to the above aspect (3), the travel controller is configured to generate a target trajectory, which is used as a reference when causing the own-vehicle to travel along the scheduled route, on the basis of a curvature of the scheduled route, the travel controller is configured to perform the steering control on the basis of a target steering angle corresponding to a curvature of the generated target trajectory, and the vehicle control system further includes an output unit configured to output, when the curvature of the scheduled route is equal to or greater than a predetermined value or when the target steering angle is equal to or greater than a predetermined angle, information prompting the occupant to monitor surroundings of the own-vehicle if a monitoring result of the monitor indicates that the occupant is not monitoring surroundings of the own-vehicle.

(5) The vehicle control system according to any one of the above aspects (1) to (4) further includes a detector configured to detect a state in which an occupant of the own-vehicle is operating an operator, wherein the travel controller is configured to perform, if the control index value exceeds the upper limit value, the speed control with the target speed which is lower when a detection result of the detector indicates that the occupant is not operating the operator than when the detection result indicates that the occupant is operating the operator.

(6) In the vehicle control system according to the above aspect (5), the travel controller is configured to generate a target trajectory, which is used as a reference when causing the own-vehicle to travel along the scheduled route, on the basis of a curvature of the scheduled route, the travel controller is configured to perform the steering control on the basis of a target steering angle corresponding to a curvature of the generated target trajectory, and the vehicle control system further includes an output unit configured to output, when the curvature of the scheduled route is equal to or greater than a predetermined value or when the target steering angle is equal to or greater than a predetermined angle, information prompting the occupant to operate the operator if a detection result of the detector indicates that the occupant is not operating the operator.

(7) The vehicle control system according to any of the above aspects (3) to (6) further includes a monitor configured to monitor an occupant of the own-vehicle, and a detector configured to detect a state in which the occupant of the own-vehicle is operating an operator, wherein the travel controller is configured to make the target speed lower when the occupant is not operating the operator than when the occupant is not monitoring surroundings of the own-vehicle.

(8) The vehicle control system according to any of the above aspects (1) to (7) further includes an output unit configured to output information regarding speed change of the own-vehicle to an occupant of the own-vehicle when the travel controller performs the speed control with the target speed which is lower when the control index value exceeds the upper limit value than when the control index value does not exceed the upper limit value.

(9) Another aspect of the present invention provides a vehicle control system including an acquirer configured to acquire environmental information including information of a reference speed preset on a scheduled route on which an own-vehicle travels, and a travel controller configured to perform speed control and steering control of the own-vehicle on the basis of the environmental information acquired by the acquirer, wherein the travel controller is configured to calculate an acceleration occurring in relation to a width direction of the own-vehicle when the own-vehicle travels on the scheduled route at the reference speed, to perform the speed control with the reference speed as the target speed of the own-vehicle when the calculated acceleration is equal to or less than an upper limit value, and to perform the speed control with a speed at which the calculated acceleration is equal to or less than the upper limit value as the target speed of the own-vehicle when the calculated acceleration exceeds the upper limit value.

(10) Another aspect of the present invention provides a vehicle control method including an in-vehicle computer acquiring environmental information including information of a reference speed preset on a scheduled route on which an own-vehicle travels, performing speed control and steering control of the own-vehicle on the basis of the acquired environmental information, and performing the speed control with the reference speed as a target speed of the own-vehicle if a control index value regarding the steering control is equal to or less than an upper limit value when the own-vehicle travels on the scheduled route at the reference speed and performing the speed control with a speed at which the control index value regarding the steering control is equal to or less than the upper limit value as the target speed of the own-vehicle if the control index value exceeds the upper limit value.

According to any one of the above aspects (1) to (10), speed control is performed with the reference speed as a target speed of the own-vehicle if the control index value regarding the steering control is equal to or less than the upper limit value when the own-vehicle travels on the scheduled route at the reference speed, and speed control is performed with a speed at which the control index value regarding the steering control is equal to or less than the upper limit value as the target speed of the own-vehicle if the control index value exceeds the upper limit value, and therefore it is possible to appropriately control the vehicle speed.

BRIEF DESCRIPTION OF THE DRAWINGS

FIG. 7 is a diagram showing an exemplary table for obtaining a necessary steering angle.

FIG. 10 is a diagram showing an exemplary screen displayed on a display device of an HMI when an eyes-on request is made.

FIG. 11 is a diagram showing an exemplary screen displayed on a display device of an HMI when a hands-on request is made.

FIG. 12 is a diagram showing another exemplary scenario in which a branching event is activated.

DESCRIPTION OF EMBODIMENTS

Hereinafter, embodiments of a vehicle control system and a vehicle control method of the present invention will be described with reference to the drawings.

First Embodiment

[Overall Configuration]

Figure 1:
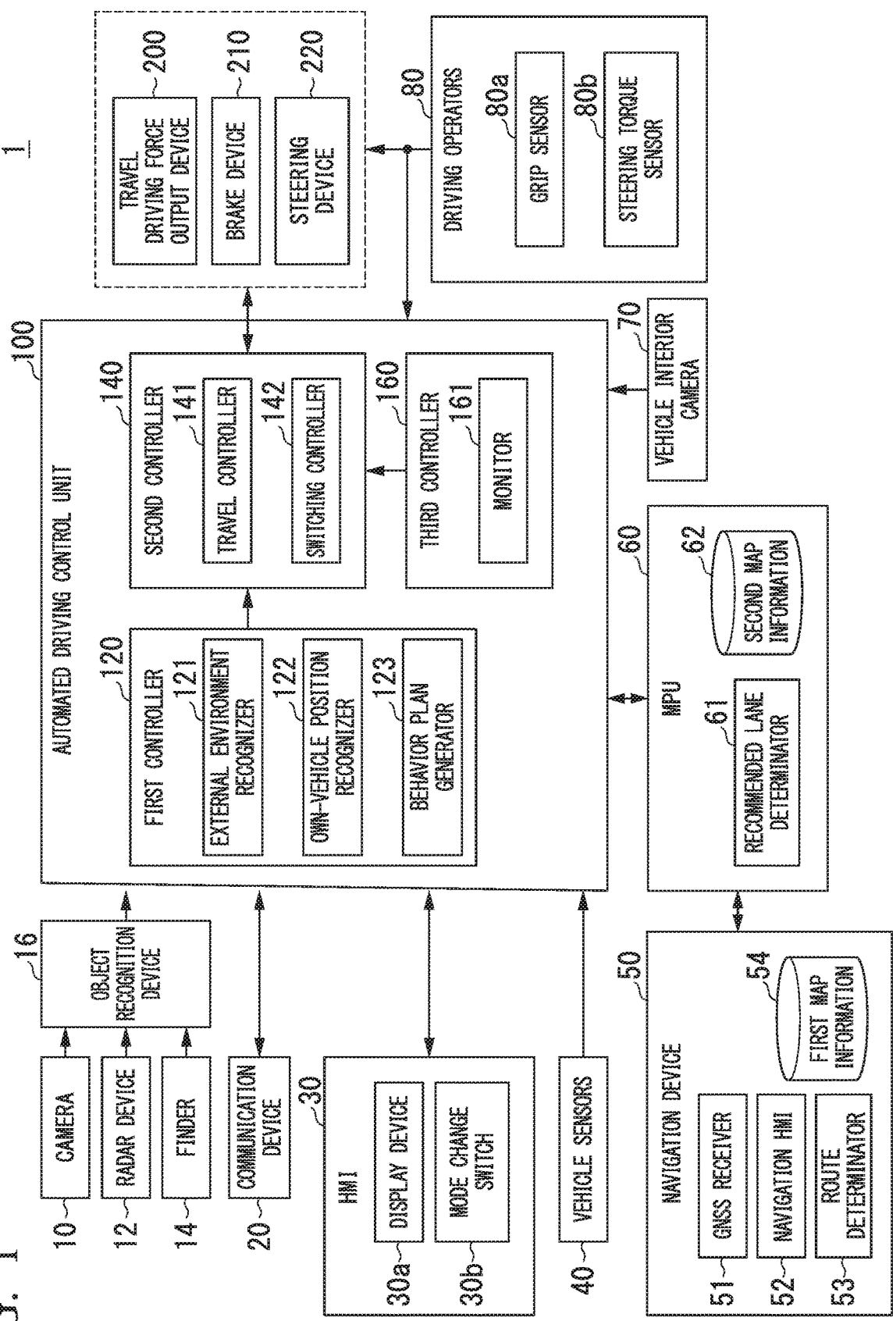
FIG. 1 is a configuration diagram of a vehicle control system including an automated driving control unit of a first embodiment.

FIG. 1 is a configuration diagram of a vehicle control system 1 including an automated driving control unit (automated driving controller) 100 of a first embodiment. A vehicle in which the vehicle control system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle control system 1 includes, for example, a camera 10, a radar device 12, a finder 14, an object recognition device (object recognizer) 16, a communication device (communicator) 20, a human machine interface (HMI) 30, vehicle sensors 40, a navigation device (navigator) 50, a map position unit (MPU) 60, a vehicle interior camera 70, driving operators 80, an automated driving control unit 100, a travel driving force output device (travel driving force outputter) 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 are attached to the vehicle in which the vehicle control system 1 is mounted (hereinafter referred to as an own-vehicle M) at arbitrary locations. For imaging the area in front of the vehicle, a camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar device 12 radiates radio waves such as millimeter waves around the own-vehicle M and detects radio waves reflected by an object (reflected waves) to detect at least the position (distance and orientation) of the object. One or a plurality of radar devices 12 may be attached to the own-vehicle M at arbitrary locations. The radar device 12 may detect the position and velocity of an object using a frequency modulated continuous wave (FM-CW) method.

The finder 14 is a light detection and ranging or laser imaging detection and ranging (LIDAR) finder which measures scattered light from an object in response to illuminated light to detect the distance to the object. One or a plurality of finders 14 may be attached to the own-vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control unit 100. The object recognition device 16 may output part of information input from the camera 10, the radar device 12, or the finder 14 to the automated driving control unit 100 as it is.

For example, the communication device 20 communicates with other vehicles near the own-vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own-vehicle M and receives an input operation from the occupant. The HMI 30 includes, for example, a display device 30a such as a liquid crystal display (LCD) or an organic electroluminescence (EL) display, and a mode change switch 30b. The display device 30a is attached to, for example, each part of the instrument panel or an arbitrary portion of a front occupant seat or a rear seat. The mode change switch 30b is an operation device provided for switching between an automated driving mode and a manual driving mode which will be described later. The mode change switch 30b receives an operation from the occupant and outputs a switching signal instructing that the mode be changed/switched to the automated driving control unit 100. The HMI 30 may include, for example, a speaker, a buzzer, a touch panel, or the like in addition to the display device 30a and the mode change switch 30b.

The vehicle sensors 40 include, for example, a vehicle speed sensor that detects the speed of the own-vehicle M, an acceleration sensor that detects the acceleration thereof, a yaw rate sensor that detects an angular speed thereof about the vertical axis, an orientation sensor that detects the orientation of the own-vehicle M, or the like.

The navigation device 50 includes, for example, a global navigation satellite system (GNSS) receiver 51, a navigation HMI 52, and a route determinator 53 and holds first map information 54 in a storage device such as a hard disk drive (HDD) or a flash memory. The GNSS receiver specifies the position of the own-vehicle M on the basis of signals received from GNSS satellites. The position of the own-vehicle M may also be specified or supplemented by an inertial navigation system (INS) using the output of the vehicle sensors 40. The navigation HMI 52 includes a display device, a speaker, a touch panel, a key, or the like. The navigation HMI 52 may be partly or wholly shared with the HMI 30 described above. For example, the route determinator 53 determines a route from the position of the own-vehicle M specified by the GNSS receiver 51 (or an arbitrary input position) to a destination input by the occupant using the navigation HMI 52 by referring to the first map information 54.

The first map information 54 is, for example, information representing shapes of roads by links indicating roads and nodes connected by the links. The first map information 54 may include curvatures of roads, point of interest (POI) information, or the like. The route determined by the route determinator 53 is output to the MPU 60. The navigation device 50 may also perform route guidance using the navigation HMI 52 on the basis of the route determined by the route determinator 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server. The route to the destination that the route determinator 53 determines on the basis of the first map information 54 is an example of the "scheduled route." The route to the destination determined by the navigation server which is the communication partner of the navigation device 50 is another example of the "scheduled route."

The MPU 60 functions, for example, as a recommended lane determinator 61 and holds the second map information 62 in a storage device such as an HDD or a flash memory. The recommended lane determinator 61 divides the route provided from the navigation device 50 into a plurality of blocks (for example, into blocks each 100 meters long in the direction in which the vehicle travels) and determines a recommended lane for each block by referring to the second map information 62. The recommended lane determinator 61 performs a process of determining the recommended lane such that it is given a position in a lane order counted from the leftmost lane. When there is a branch point, a merge point, or the like on the route, the recommended lane determinator 61 determines a recommended lane such that the own-vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as a reference speed of each road, the number of lanes, the widths of lanes, the gradients of roads, the positions of roads (three-dimensional coordinates including longitude, latitude and height), the curvatures of curves of roads or their lanes, the positions of merge or branch points of lanes, signs installed on roads, or the like. The reference speed is, for example, a legal speed of the road or an average speed of a plurality of vehicles that have traveled the road in the past. The second map information 62 may be updated as needed by accessing another device using the communication device 20. The second map information 62 is an example of the "environmental information," and the information regarding the reference speed of the road included in the second map information 62 is an example of the "speed information."

The vehicle interior camera 70 captures an image of, for example, the upper body around the face of an occupant sitting in the driver's seat. The captured image of the vehicle interior camera 70 is output to the automated driving control unit 100.

The driving operators 80 include, for example, an accelerator pedal, a brake pedal, a shift lever, a steering wheel, and other operators. Operation detectors for detecting the amounts of operation are attached to the driving operators 80. The operation detectors detect the amount of depression of the accelerator pedal or the brake pedal, the position of the shift lever, the steering angle of the steering wheel, and the like. The operation detectors output detection signals indicating the detected amounts of operation of the operators to either or both of the automated driving control unit 100 or the travel driving force output, brake, and steering devices 200, 210, and 220.

Further, in the present embodiment, a grip sensor 80*a* (an example of the "detector" in the claims) and a steering torque sensor 80*b* (another example of the "detector" in the claims) are attached to the steering wheel. For example, upon detecting a weak current generated when the occupant touches the steering wheel, the grip sensor 80*a* outputs a predetermined detection signal to the automated driving control unit 100. The steering torque sensor 80*b* detects a steering torque generated around the rotation axis (shaft) of the steering wheel and outputs a predetermined detection signal to the automated driving control unit 100 when the detected steering torque is equal to or greater than a threshold value. In the following description, a state in which the steering wheel is detected as being operated (gripped) on the basis of the detection signal of either or both of the grip sensor 80*a* and the steering torque sensor 80*b* is referred to as a "hands-on state," and a state in which this is not so is referred to as a hands-off state.

The automated driving control unit 100 includes, for example, a first controller 120, a second controller 140, and a third controller 160. Some or all of the first controller 120, the second controller 140, and the third controller 160 are each realized by a processor such as a central processing unit (CPU) executing a program (software). Some or all of the respective functional units of the first controller 120, the second controller 140, and the third controller 160 which will be described below may be realized by hardware such as a large scale integration (LSI), an application specific integrated circuit (ASIC), or a field-programmable gate array (FPGA) or may be realized by hardware and software in cooperation. The program may be stored in a storage device such as a hard disk drive (HDD) or a flash memory in advance or may be stored in a detachable storage medium such as a DVD or a CD-ROM and then installed on the storage device by inserting the storage medium into a drive device.

The first controller 120 includes, for example, an external environment recognizer 121, an own-vehicle position recognizer 122, and a behavior plan generator 123. A combination of the external environment recognizer 121 and the own-vehicle position recognizer 122 is an example of the "acquirer."

The external environment recognizer 121 recognizes states of a nearby vehicle(s) such as the position, speed and acceleration thereof on the basis of information (another example of the environmental information) input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes). The external environment recognizer 121 may also recognize the positions of guardrails or utility poles, parked vehicles, pedestrians, and other objects in addition to nearby vehicles.

The own-vehicle position recognizer 122 recognizes, for example, a (traveling) lane in which the own-vehicle M is traveling and the relative position and attitude of the own-vehicle M with respect to the traveling lane. The own-vehicle position recognizer 122 recognizes the traveling lane, for example, by comparing a pattern of road lane lines (for example, an arrangement of solid and broken lines) obtained from the second map information 62 (an example of the environmental information) with a pattern of road lane lines near the own-vehicle M recognized from an image captured by the camera 10. This recognition may be performed taking into consideration a position of the own-vehicle M acquired from the navigation device 50 or a result of processing by the INS.

Figure 2:
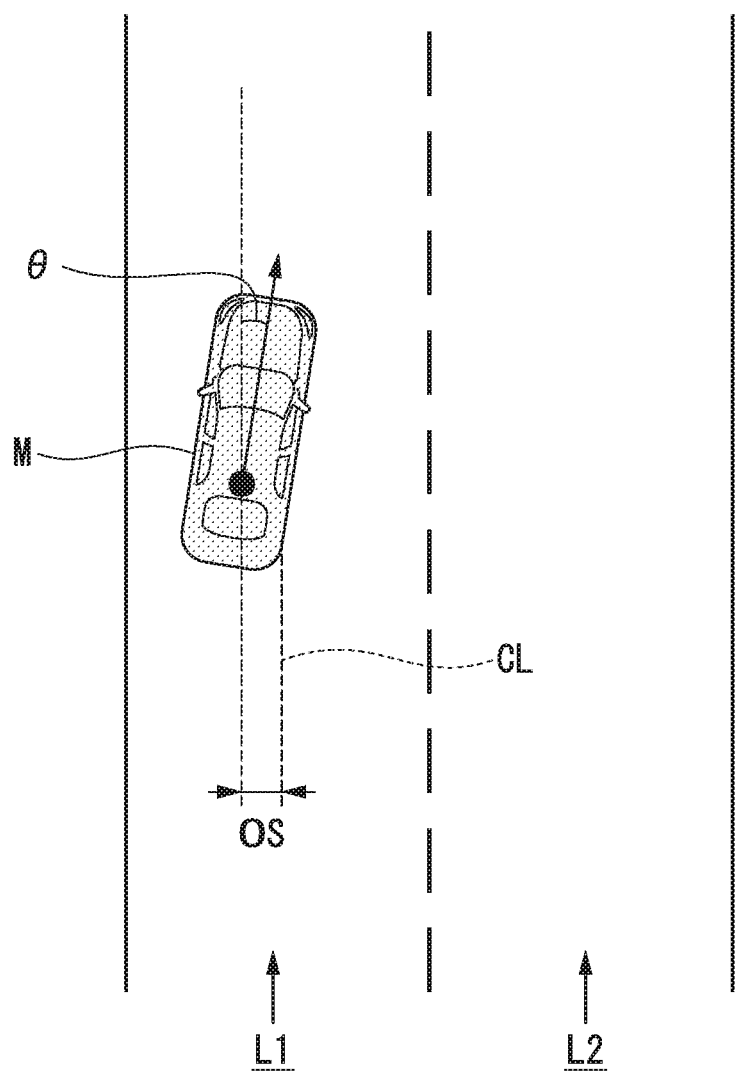
FIG. 2 is a diagram showing how the relative position and attitude of an own-vehicle M with respect to a traveling lane are recognized by an own-vehicle position recognizer.

Then, the own-vehicle position recognizer 122 recognizes, for example, the position or attitude of the own-vehicle M with respect to the traveling lane. FIG. 2 is a diagram showing how the relative position and attitude of the own-vehicle M with respect to the traveling lane L1 are recognized by the own-vehicle position recognizer 122. For example, the own-vehicle position recognizer 122 recognizes both a deviation OS from a traveling lane center CL of a reference point (for example, the center of gravity) of the own-vehicle M and an angle $\theta$ formed by the travel direction of the own-vehicle M relative to an extension line of the traveling lane center CL as the relative position and attitude of the own-vehicle M with respect to the traveling lane L1. Alternatively, the own-vehicle position recognizer 122 may recognize the position of the reference point of the own-vehicle M with respect to one of the sides of the traveling lane L1 or the like as the relative position of the own-vehicle M with respect to the traveling lane. The relative position of the own-vehicle M recognized by the own-vehicle position recognizer 122 is provided to the recommended lane determinator 61 and the behavior plan generator 123.

The behavior plan generator 123 determines events which are to be sequentially performed in the automated driving control such that the own-vehicle M travels in the recommended lane determined by the recommended lane determinator 61 and copes with situations occurring near the own-vehicle M. Events are pieces of information defining the travel states of the own-vehicle M. Examples of the events include a constant-speed travel event which is an event of traveling in the same traveling lane at a constant speed, a lane change event which is an event of changing the traveling lane of the own-vehicle M, an overtaking event which is an event of overtaking a preceding vehicle, a following travel event which is an event of following a preceding vehicle, a merging event that is an event of causing the vehicle to merge at a merge point, a branching event which is an event of causing the own-vehicle M to travel in a target direction at a branch point of the road, an emergency stop event which is an event of causing the own-vehicle M to make an emergency stop, and a handover event which is an event of terminating automated driving and switching to manual driving. Here, "following" a preceding vehicle indicates, for example, a mode of traveling while keeping the relative distance (inter-vehicle distance) between the own-vehicle M and the preceding vehicle constant. During execution of these events, behaviors for avoidance may sometimes be planned on the basis of situations occurring near the own-vehicle M (such as the presence of nearby vehicles and pedestrians or lane narrowing due to road construction).

The behavior plan generator 123 generates a target trajectory along which the own-vehicle M will travel in the future. The target trajectory is expressed by an arrangement of points (trajectory points) which are to be reached by the own-vehicle M in order. The trajectory points are points to be reached by the own-vehicle M at intervals of a predetermined travel distance. Apart from this, a target speed Vt for each predetermined sampling time (for example, every several tenths of a second) is determined as a part (an element) of the target trajectory. The target speed Vt may include elements such as a target acceleration and a target jerk. The trajectory points may be respective positions of the predetermined sampling times which the own-vehicle M is to reach at the corresponding sampling times. In this case, the target speed Vt is determined by the interval between the trajectory points.

The behavior plan generator 123 determines target speeds Vt at which to cause the own-vehicle M to travel along the target trajectory according to reference speeds preset in the route to the destination. For example, in the case in which the reference speed is set to 80 [km/h] in a certain section A and the reference speed is set to 40 [km/h] in another section B, the behavior plan generator 123 basically determines that a target speed Vt in the section A is 80 [km/h] and a target speed Vt in the section B is 40 [km/h].

Figure 3:
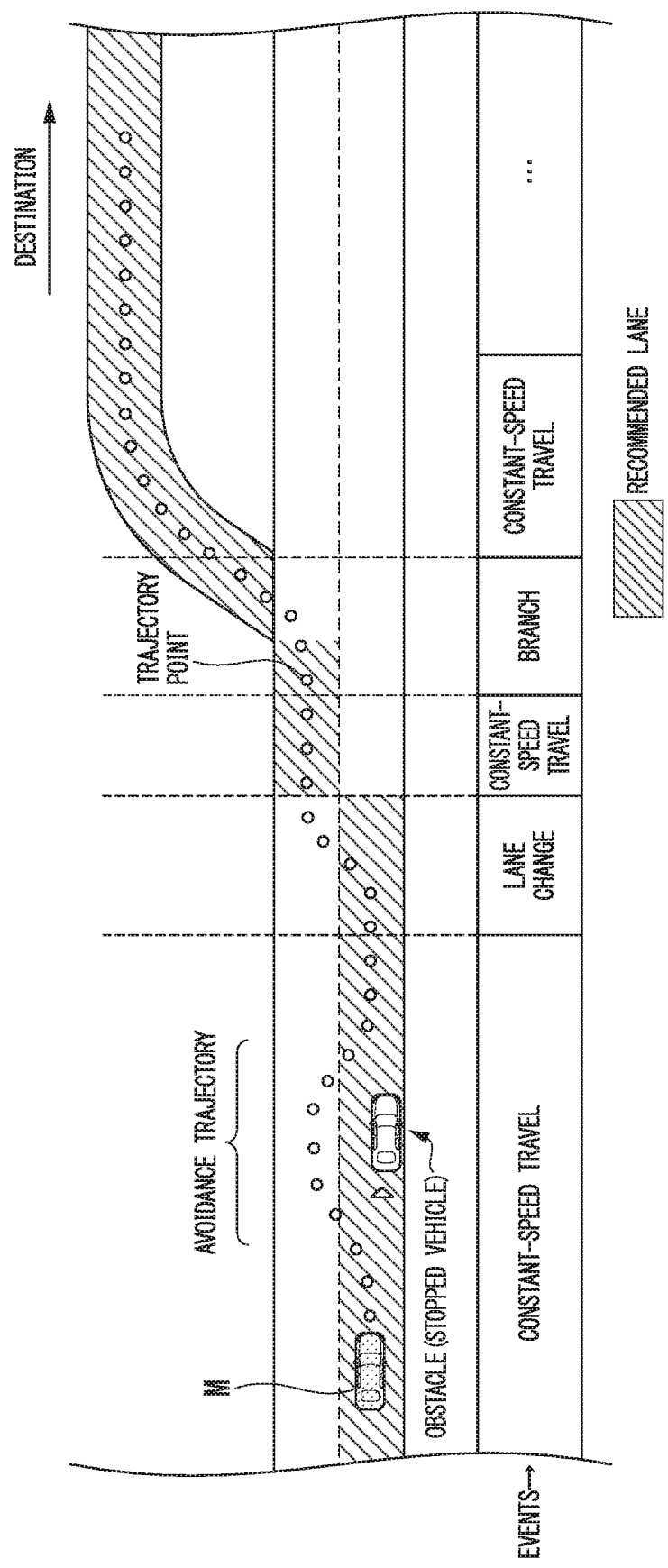
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own-vehicle M approaches a predetermined distance (which may be determined according to the types of events) before a point for switching to the recommended lane, the behavior plan generator 123 activates a lane change event, a branching event, a merging event, or the like. When it becomes necessary to avoid an obstacle OB during execution of each event, an avoidance trajectory is generated as shown in FIG. 3.

For example, the behavior plan generator 123 generates a plurality of candidate target trajectories and selects an optimum target trajectory at a given point in time.

The second controller 140 includes, for example, a travel controller 141 and a switching controller 142. The travel controller 141 controls the travel driving force output device 200, the brake device 210, and the steering device 220 such that the own-vehicle M passes along the target trajectory generated by the behavior plan generator 123 at scheduled times.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel controller 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel controller 141 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the travel controller 141 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the travel controller 141 or information input from the driving operators 80 to change the direction of the steering wheels.

For example, the travel controller 141 determines the amounts of control of the travel driving force output device 200 and the brake device 210 according to the target speed Vt indicated by the target trajectory.

For example, the travel controller 141 determines the amount of control of the electric motor in the steering device 220 such that a displacement corresponding to a target steering angle $\phi t$ indicated by the target trajectory is given to the wheels.

The switching controller 142 switches the driving mode of the own-vehicle M on the basis of a behavior plan generated by the behavior plan generator 123. The driving mode includes an automated driving mode in which the travel driving force output device 200, the brake device 210, and the steering device 220 are controlled under the control of the second controller 140 and a manual driving mode in which the travel driving force output device 200, the brake device 210, and the steering device 220 are controlled by an occupant's operation on the driving operators 80.

For example, the switching controller 142 switches the driving mode from the manual driving mode to the automated driving mode at a scheduled start point of the automated driving. The switching controller 142 switches the driving mode from the automated driving mode to the manual driving mode at a scheduled end point (for example, the destination) of the automated driving.

For example, the switching controller 142 may switch between the automated driving mode and the manual driving mode on the basis of a switching signal input from the mode change switch 30b included in the HMI 30.

The switching controller 142 may also switch the driving mode from the automated driving mode to the manual driving mode on the basis of a detection signal input from a driving operator 80. For example, when the amount of operation indicated by the detection signal exceeds a threshold value, that is, when the driving operator 80 has received an operation the amount of which exceeds the threshold value from the occupant, the switching controller 142 switches the driving mode from the automated driving mode to the manual driving mode. For example, in the case in which the driving mode has been set to the automated driving mode, the switching controller 142 switches the driving mode from the automated driving mode to the manual driving mode when both the steering wheel and either the accelerator pedal or the brake pedal are operated by the occupant with the amounts of operation exceeding corresponding threshold values.

During the manual driving mode, an input signal (a detection signal indicating how much the amount of operation is) from each driving operator 80 is output to the travel driving force output device 200, the brake device 210, and the steering device 220. The input signal from each driving operator 80 may be output to the travel driving force output device 200, the brake device 210, and the steering device 220 via the automated driving control unit 100. Electronic control units (ECUs) of the travel driving force output device 200, the brake device 210, and the steering device 220 perform their operations on the basis of input signals from the driving operators 80 or the like.

The third controller 160 includes, for example, a monitor 161. The monitor 161 monitors (determines) whether or not an occupant sitting in the driver's seat (who is a driver in the manual driving mode) is monitoring the surroundings of the own-vehicle M, for example, on the basis of the captured image output by the vehicle interior camera 70. For example, the monitor 161 detects whether or not the line of sight of the occupant is facing the front (i.e., forward with respect to the own-vehicle M) from the captured image including the occupant's face by image processing such as template matching. For example, the monitor 161 determines that the occupant is monitoring the surroundings of the own-vehicle M when the line of sight of the occupant is facing the front and determines that the occupant is not monitoring the surroundings of the own-vehicle M when the line of sight of the occupant is not facing the front. In the following description, the state in which the line of sight of the occupant is facing the front is referred to as an "eyes-on state," and the state in which the line of sight of the occupant is not facing the front is referred to as an "eyes-off state." The monitor 161 outputs information indicating an eyes-on state or an eyes-off state to the second controller 140 as a monitoring result of the occupant.

[Trajectory Generation Based on Branching Event]

An exemplary method for generating a target trajectory by the behavior plan generator 123 will now be described. The method described below is performed, for example, when the "branching event" is activated among the various events described above. The control method described below is not limited to a branching event but may also be performed for a "curve traveling event" such as an event of transiting from a simple straight line to a curve.

Figure 4:
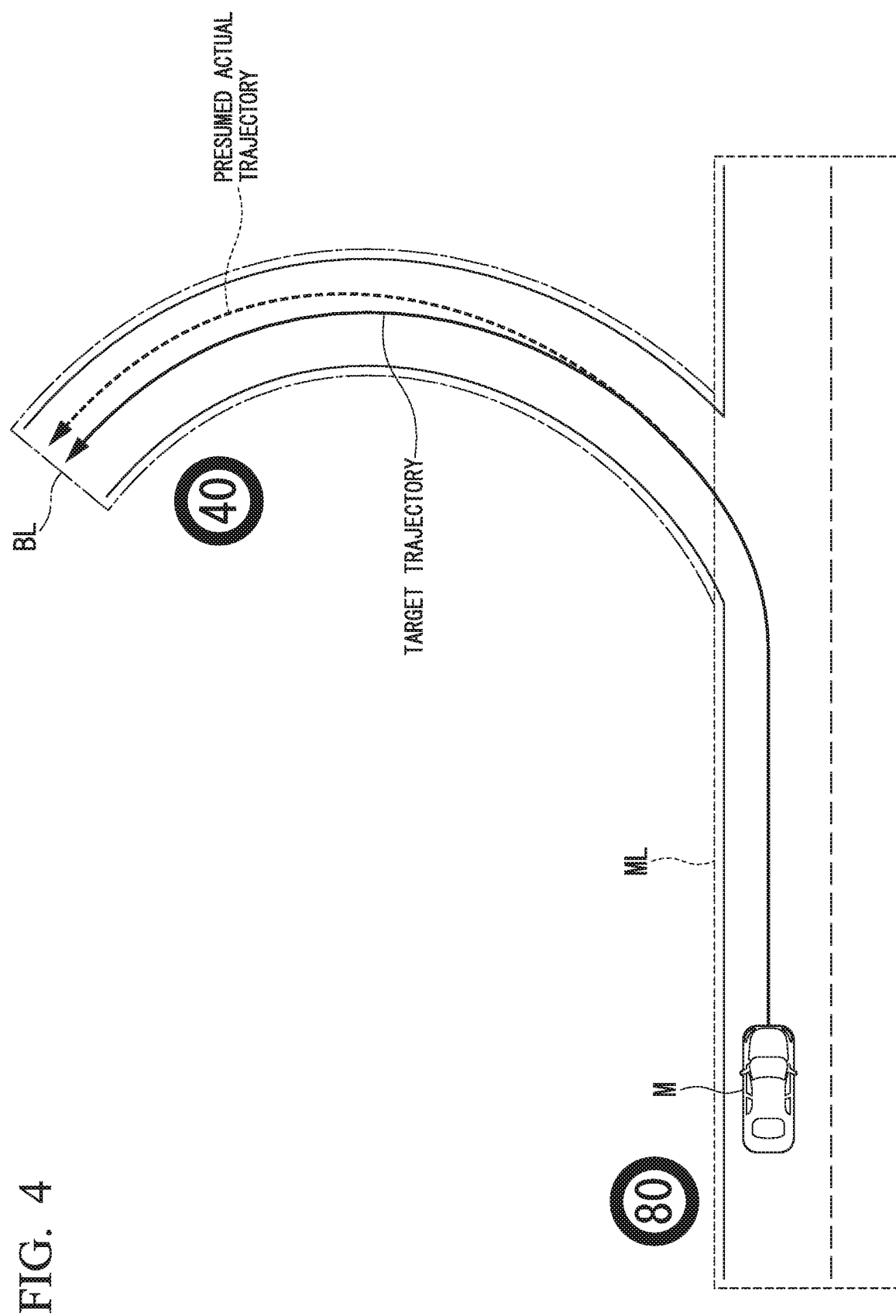
FIG. 4 is a diagram showing an exemplary scenario in which a branching event is activated.

FIG. 4 is a diagram showing an exemplary scenario in which a branching event is activated. In the shown example, an own-vehicle M is traveling on a main line ML and a route entering a branch lane BL which branches from the main line ML is defined as a route to the destination determined by the route determinator 53. The branch lane BL is, for example, a road for connecting an expressway and an ordinary road which is called a ramp, and forms a fully curved road. When such a branch lane BL is included in a scheduled route, the behavior plan generator 123 activates a branching event. For example, a target trajectory and a target speed (including a target acceleration) for smoothly traveling from the main line ML to the branch lane BL by lane change or virtual lane keeping are determined in the branching event.

For example, the behavior plan generator 123 determines the shape of the target trajectory according to the shape of the route to the destination that the route determinator 53 determines on the basis of the first map information 54. More specifically, the behavior plan generator 123 generates a target trajectory that has about the same curvature as that of the route and that passes through the center of the route (road).

When 80 [km/h] is set as a reference speed of the main line ML and 40 [km/h] smaller than the reference speed of the main line ML is set as a reference speed of the branch lane BL as in the shown example, the behavior plan generator 123 determines that a target speed Vt in the main line ML is 80 [km/h] which is the reference speed of the main line ML and determines that a target speed Vt in the branch lane BL is 40 [km/h] which is the reference speed of the branch lane BL. Here, it is desirable that the own-vehicle M which is traveling at the reference speed of the main line ML enter the branch lane BL after sufficient deceleration.

For example, when the behavior plan generator 123 determines that a target speed Vt for traveling in the branch lane BL is 40 [km/h] which is the reference speed of the branch lane BL, the behavior plan generator 123 generates a target trajectory as shown by a solid-line arrow in FIG. 4.

Here, an upper limit angle is preset in an allowable range of the steering angle such that a lateral acceleration (i.e., an acceleration in the width direction of the vehicle) that can occur by traveling a branch lane BL which is a curved road is equal to or less than a certain value from the viewpoint of the steering performance limit of the own-vehicle M or consideration for the occupant. Therefore, when a steering angle corresponding to the target trajectory (i.e., a steering angle which should be taken originally) is equal to or greater than the upper limit angle, the own-vehicle M may deviate from the target trajectory radially outward from the curve and thus there is a possibility that the vehicle will travel at a position biased to either the left or the right (i.e., to the side where the curve is convex) of the center of the lane along which it should have travelled originally. That is, there is a possibility that the own-vehicle M will travel along a trajectory as indicated by a dashed-line arrow in FIG. 4. Based on this, when the road curvature of the route is great, the behavior plan generator 123 does not adopt the reference speed of the branch lane BL (40 [km/h] in the shown example) directly as a target speed Vt, but instead determines a speed lower than the reference speed as a target speed Vt such that the lateral acceleration is equal to or less than a certain value while preventing deviation from the target trajectory.

[Processing Flow]

Figure 5:
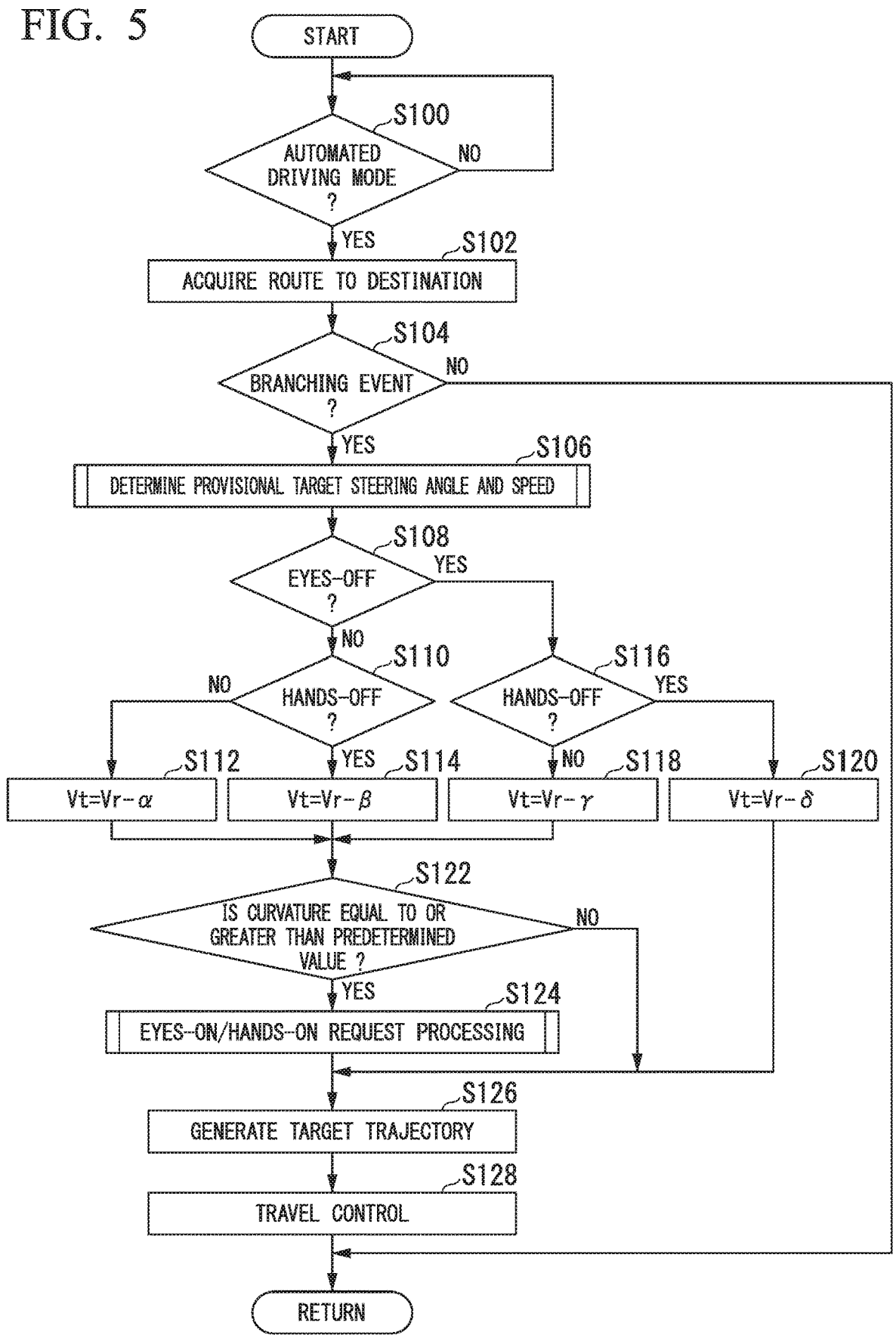
FIG. 5 is a flowchart showing a series of processing by a behavior plan generator, a travel controller, and a switching controller.

FIG. 5 is a flowchart showing a series of processing by the behavior plan generator 123, the travel controller 141, and the switching controller 142. The processing of this flowchart may be repeated, for example, at intervals of a predetermined period.

First, the behavior plan generator 123 waits until the driving mode is switched to the automated driving mode by the switching controller 142 (step S100). When the driving mode is switched to the automated driving mode by the switching controller 142, the behavior plan generator 123 acquires road information of a route to the destination, for which a recommended lane has been determined by the recommended lane determinator 61, from the MPU 60 (step S102). This road information of the route includes, for example, information such as the reference speed and the curvature described above.

Next, the behavior plan generator 123 determines whether or not an event to be activated is a branching event (step S104). For example, when a branch lane BL is included in the route acquired from the MPU 60 and the own-vehicle M has reached near a branch point of the branch lane BL, the behavior plan generator 123 determines that the event to be activated is a branching event. "Near" the branch point indicates, for example, a section up to several kilometers before reaching the branch point. When the event to be activated is not a branching event, the processing of this flowchart ends. When the curvature of the route acquired from the MPU 60 is equal to or greater than a predetermined value (for example, about several tens[%]), the behavior plan generator 123 determines that the event to be activated is a curve traveling event in the processing of S104 and performs processing which will be described below.

On the other hand, upon determining that the event to be activated is a branching event or a curve traveling event, the behavior plan generator 123 temporarily determines a provisional steering angle which is to be used in determining a target steering angle ϕt (hereinafter referred to as a provisional target steering angle ϕr) and a provisional speed which is to be used in determining a target speed Vt (hereinafter referred to as a provisional target speed Vr) on the basis of the curvature and the reference speed of the route (step S106). The provisional target steering angle ϕr and the provisional target speed Vr are index values obtained as temporary calculation results and are referred to in a determination process which will be described later.

Figure 6:
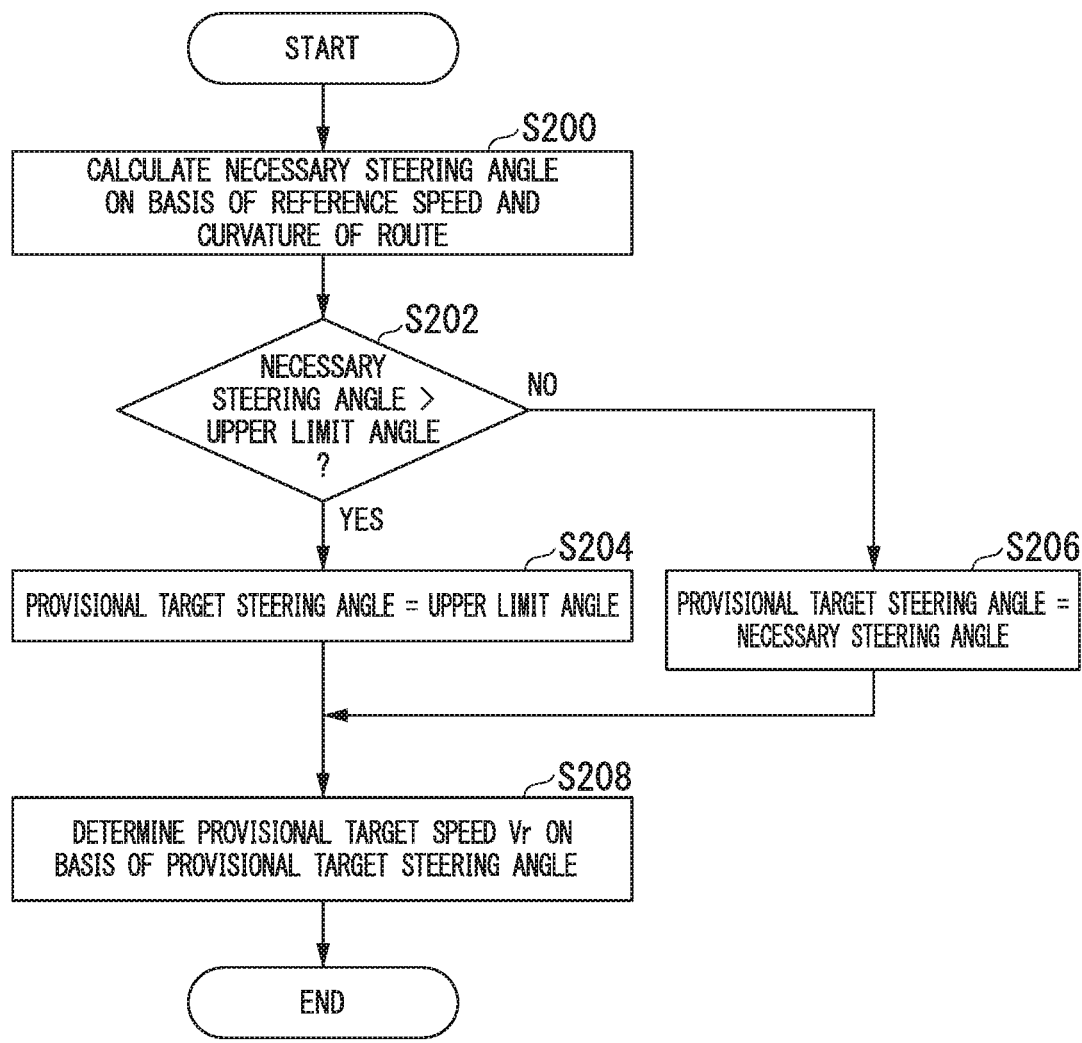
FIG. 6 is a detailed flowchart of the processing of S106 by the behavior plan generator.

FIG. 6 is a detailed flowchart of the processing of S106 by the behavior plan generator 123.

First, the behavior plan generator 123 calculates a necessary steering angle which is required when causing the own-vehicle M to travel on the basis of the curvature and the reference speed of the route (step S200). This necessary steering angle is an index value obtained as a temporary calculation result, which may exceed the upper limit angle which is preset such that the lateral acceleration is equal to or less than a certain value. The necessary steering angle is an example of the "control index value."

FIG. 7 is a diagram showing an exemplary table for obtaining a necessary steering angle. For example, on the table, necessary steering angles obtained in advance through experiments, simulations or the like are associated with the curvature and the reference speed as variables. Referring to this table, the behavior plan generator 123 derives a necessary steering angle associated with the curvature and the reference speed. For example, when the curvature is 40[%] and the reference speed is 40 [km/h], the necessary steering angle is obtained as 32[°]. In this table, the variables may be replaced by two functions or the like.

Next, the behavior plan generator 123 determines whether or not the estimated necessary steering angle exceeds the upper limit angle (step S202). When the necessary steering angle exceeds the upper limit angle, the behavior plan generator 123 sets the provisional target steering angle ϕr to a steering angle equal to or lower than the upper limit angle (for example, the same steering angle as the upper limit angle) (step S204).

When the necessary steering angle exceeds the upper limit angle, the behavior plan generator 123 controls the HMI 30 to notify the occupant that the vehicle is overspeed when it travels on a predetermined route in the automated driving mode. More specifically, the behavior plan generator 123 notifies the occupant that the vehicle is overspeed by causing the display device 30a of the HMI 30 to display an image or causing the speaker (not shown) to output sound. The behavior plan generator 123 may also notify the occupant that the vehicle is overspeed by vibrating the steering wheel or vibrating a seat in which the occupant sits. A combination of the HMI 30 and the behavior plan generator 123 is an example of the "output unit."

On the other hand, when the necessary steering angle is equal to or less than the upper limit angle, the behavior plan generator 123 sets the provisional target steering angle ϕr to the same steering angle as the necessary steering angle (step S206).

Next, the behavior plan generator 123 determines the provisional target speed Vr on the basis of the provisional target steering angle ϕr (step S208).

For example, in the case in which the upper limit angle of the steering angle is preset to 25[°], the reference speed of the route is preset to 40 [km/h], and the curvature is preset to 40[%] and thus a necessary steering angle is obtained as 32[°] according to the table described above, the behavior plan generator 123 sets the provisional target steering angle ϕr to the upper limit angle or a lower steering angle since the necessary steering angle exceeds the upper limit angle. For example, in the case of this table, the provisional target steering angle ϕr is set to 24[°] which is the greatest below the upper limit angle of 25[°]. Then, the behavior plan generator 123 determines the provisional target speed Vr to be 30 [km/h] as a speed associated with the steering angle of 24[°].

In the case in which the upper limit angle is preset to 25[°], the reference speed of the route is preset to 20 [km/h], and the curvature is preset to 40[%] and thus a necessary steering angle is obtained as 16[°] according to the table described above, the behavior plan generator 123 sets the provisional target steering angle ϕr to 16[°] which indicates the necessary steering angle since the necessary steering angle is equal to or less than the upper limit angle. In this case, the behavior plan generator 123 determines the provisional target speed Vr to be 20 [km/h] as a speed associated with this necessary steering angle. That is, the behavior plan generator 123 determines the reference speed of the route as the provisional target speed Vr.

In the above table, even when the reference speed is the same, the necessary steering angle increases as the curvature of the route increases and thus the provisional target speed Vr decreases as the curvature of the route increases. For example, when the upper limit angle is 20[%], the provisional target speed Vr can be taken up to 40 [km/h] for a route with a curvature of 30[%], whereas the provisional target speed Vr can be taken only up to 20 [km/h] for a route with a curvature of 40[%]. In this way, the behavior plan generator 123 determines the provisional target speed Vr within a range of speeds decreasing as the curvature of the route increases.

Description will now return to the description of the flowchart of FIG. 5. After determining the provisional target speed Vr and the provisional target steering angle ϕr, the behavior plan generator 123 determines whether the occupant is in an eyes-off state or in an eyes-on state on the basis of a monitoring result of the monitor 161 (step S108).

Upon determining that the occupant is in an eyes-on state, the behavior plan generator 123 determines whether the occupant is in a hands-off state or in a hands-on state on the basis of a detection result of the grip sensor 80a (step S110).

The behavior plan generator 123 may determine whether the occupant is in a hands-off state or in a hands-on state on the basis of a detection result of the steering torque sensor 80b or may determine whether the occupant is in a hands-off state or in a hands-on state on the basis of detection results of both the grip sensor 80a and the steering torque sensor 80b.

Upon determining that the occupant is in a hands-on state, the behavior plan generator 123 determines that a speed obtained by subtracting a first predetermined speed a from the provisional target speed Vr is a target speed Vt (step S112). The first predetermined speed α is a speed of zero or more.

On the other hand, upon determining that the occupant is in a hands-off state, the behavior plan generator 123 determines that a speed obtained by subtracting a second predetermined speed β higher than the first predetermined speed α from the provisional target speed Vr is a target speed Vt (step S114).

Upon determining that the occupant is in an eyes-off state in the processing of S108, the behavior plan generator 123 determines whether or not the occupant is in a hands-off state or in a hands-on state on the basis of the detection result of the grip sensor 80a, similar to the processing of S110 described above (step S116).

Upon determining that the occupant is in a hands-on state, the behavior plan generator 123 determines that a speed obtained by subtracting a third predetermined speed γ higher than the second predetermined speed β from the provisional target speed Vr is a target speed Vt (step S118).

On the other hand, upon determining that the occupant is in a hands-off state, the behavior plan generator 123 determines that a speed obtained by subtracting a fourth predetermined speed δ higher than the third predetermined speed γ from the provisional target speed Vr is a target speed Vt (step S120). The fourth predetermined speed δ may be the same speed value as the third predetermined speed γ.

Figure 8:
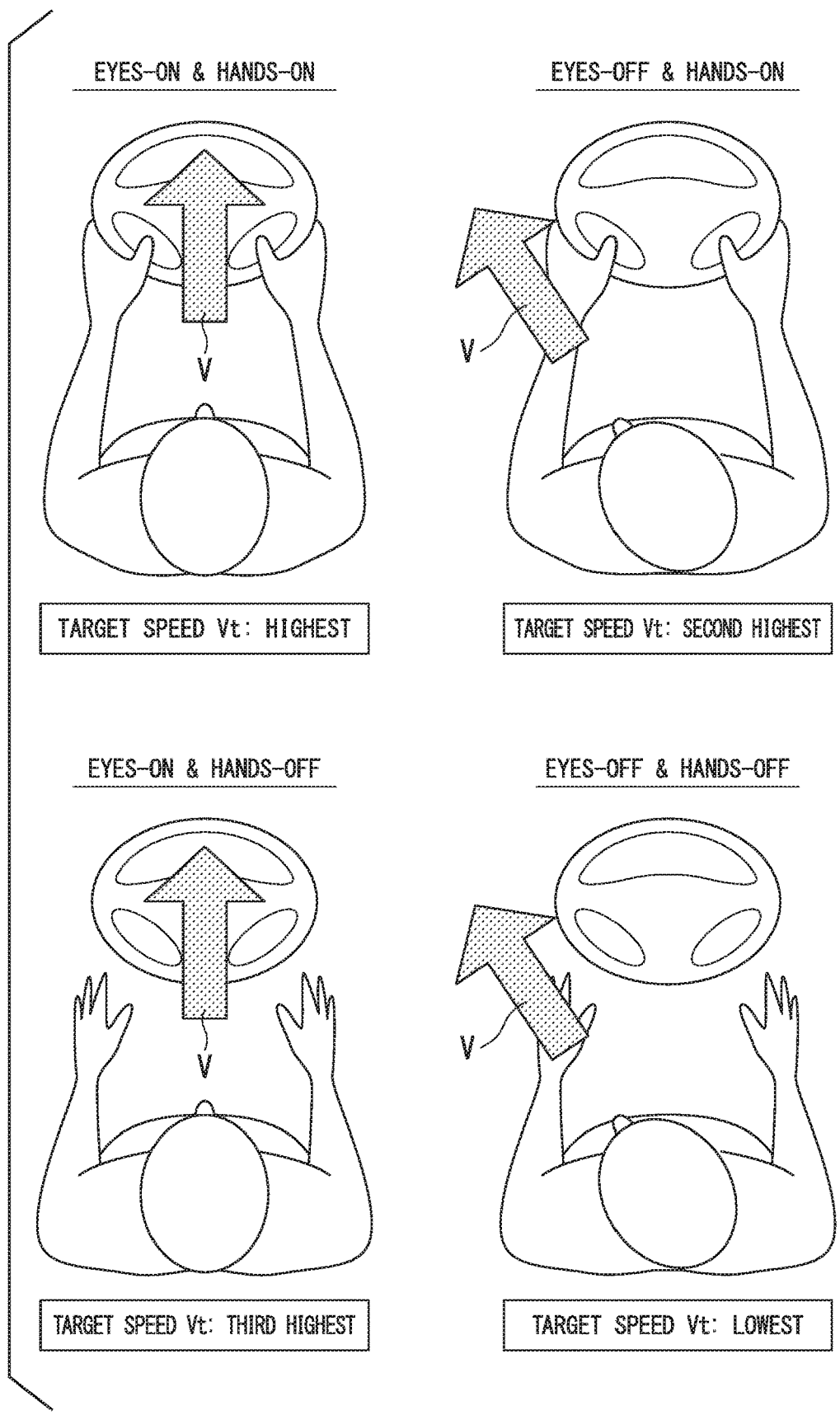
FIG. 8 is a diagram showing a magnitude relation of target speeds Vt according to conditions.

FIG. 8 is a diagram showing a magnitude relation of target speeds Vt according to conditions. Arrow V in FIG. 8 shows the direction of line of sight of the occupant. For example, assuming that the provisional target speed Vr is the same under all conditions, when the occupant is in an eyes-on state and in a hands-on state, the target speed Vt is the highest compared to the other conditions as shown in FIG. 8. When the occupant is in an eyes-off state and in a hands-on state, the target speed Vt is the second highest. When the occupant is in an eyes-on state and in a hands-off state, the target speed Vt is the third highest. When the occupant is in an eyes-off state and in a hands-off state, the target speed Vt is the lowest. Thus, the vehicle speed can be preset to be lowered, for example, when the occupant does not grip the steering wheel or does not look at the road. As a result, when the driving mode is suddenly switched from the automated driving mode to the manual driving mode by the decision of the system, it is possible to delay the progressing of the own-vehicle M, thus securing time for the occupant to be ready for driving.

Next, the switching controller 142 determines whether or not the curvature of the route is equal to or greater than a predetermined value (for example, 50[%]) (step S122). The switching controller 142 performs hands-on request processing if the occupant is in a hands-off state and performs eyes-on request processing if the occupant is in an eyes-off state (step S124). The switching controller 142 may perform hands-on request processing and eyes-on request processing when the provisional target steering angle ϕr determined by the behavior plan generator 123 is equal to or greater than a predetermined angle (for example, 30[°]).

Figure 9:
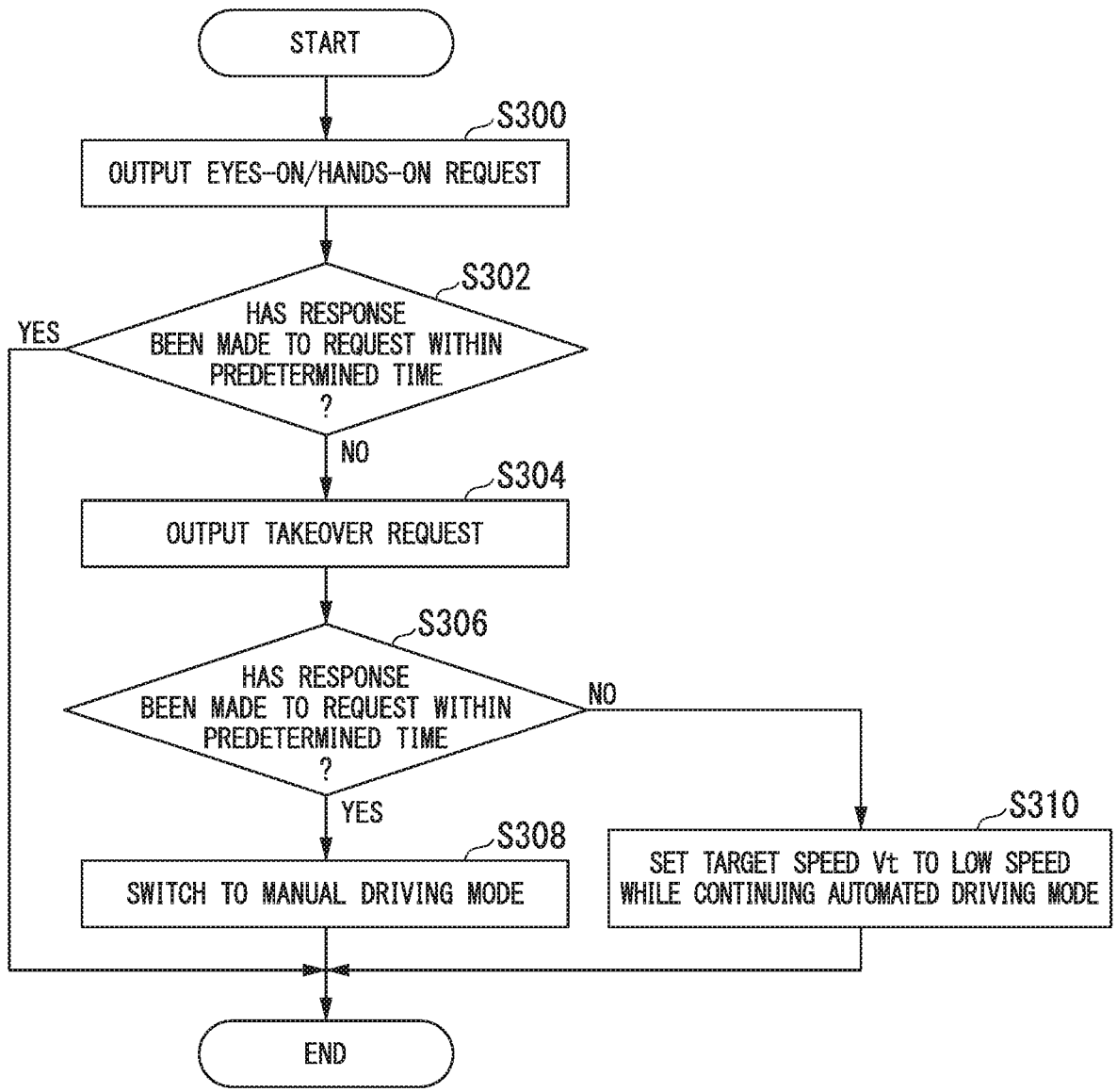
FIG. 9 is a detailed flowchart of hands-on request processing and eyes-on request processing.

FIG. 9 is a detailed flowchart of hands-on request processing and eyes-on request processing. First, the switching controller 142 controls the HMI 30 such that the HMI 30 outputs information prompting the occupant to be in a hands-on or eyes-on state, for example, by an image, sound, or the like (step S300). A combination of the HMI 30 and the switching controller 142 is another example of the "output unit."

FIG. 10 is a diagram showing an exemplary screen displayed on the display device 30a of the HMI 30 when an eyes-on request is made. FIG. 11 is a diagram showing an exemplary screen displayed on the display device 30a of the HMI 30 when a hands-on request is made.

The switching controller 142 determines whether or not a response has been made to the hands-on request or the eyes-on request within a predetermined time after causing the display device 30a to display the screen shown in FIG. 10 or 11 or causing the speaker to output sound (step S302).

For example, when the occupant has operated the touch panel or the like of the HMI 30 within the predetermined time after outputting a hands-on request or an eyes-on request, the switching controller 142 determines that a response has been made to the request. When a response has been made within the predetermined time, the processing of this flowchart ends.

On the other hand, upon determining that no response has been made within the predetermined time, the switching controller 142 controls the HMI 30 to output a takeover request (step S304). The takeover request is a request to transfer the right to operate the own-vehicle M from the system to the occupant.

Next, the switching controller 142 determines whether or not a response has been made to the takeover request within a predetermined time (step S306). For example, when the occupant has operated the mode change switch 30b of the HMI 30 or has operated a driving operator 80 with an amount of operation exceeding a threshold value within the predetermined time after outputting the takeover request, the switching controller 142 determines that a response has been made to the takeover request and switches the driving mode from the automated driving mode to the manual driving mode (step S308).

On the other hand, when the switching controller 142 determines that no response has been made to the takeover request, the behavior plan generator 123 sets the target speed Vt to a low speed of about ten [km/h] while continuing the automated driving mode (step S310). Then, the processing of this flowchart ends.

Here, description will now return to the description of the flowchart of FIG. 5. Next, the behavior plan generator 123 determines the provisional target steering angle ϕr as the target steering angle ϕt (ϕt=ϕr) and generates a target trajectory including the target speed Vt and the target steering angle ϕt as elements (step S126).

Next, the travel controller 141 determines the amounts of control of the travel driving force output device 200 and the brake device 210 on the basis of the target speed Vt of the target trajectory generated by the behavior plan generator 123 and determines the amount of control of the steering device 220 on the basis of the target steering angle ϕt, thereby performing speed control and steering control of the own-vehicle M (step S128). Then, the processing of this flowchart ends.

In the embodiment described above, the behavior plan generator 123 determines whether or not the necessary steering angle exceeds the upper limit angle. Then, upon determining that the necessary steering angle exceeds the upper limit angle, the behavior plan generator 123 sets the target speed Vt not to the reference speed, but to a speed at which the lateral acceleration is equal to or less than a certain value when the upper limit angle is set as the steering angle. However, the present invention is not limited to this.

For example, the behavior plan generator 123 may determine the reference speed of the route as a target speed Vt to generate a target trajectory, and the travel controller 141 may estimate a necessary steering angle when following the target trajectory. Then, when the estimated necessary steering angle exceeds the upper limit angle, the target speed Vt indicated by the target trajectory may be changed to a speed at which the lateral acceleration is equal to or less than a certain value.

In the embodiment described above, whether the target speed Vt is set to the reference speed or to a speed lower than the reference speed is determined depending on whether or not the necessary steering angle exceeds the upper limit angle. However, the present invention is not limited to this. For example, the behavior plan generator 123 may calculate a presumed necessary lateral acceleration from both the curvature of the route and the reference speed of the route, and may set the target speed Vt to a speed lower than the reference speed when the necessary lateral acceleration exceeds a threshold value and may set the target speed Vt to the reference speed when the lateral acceleration is equal to or less than the threshold value.

According to the first embodiment described above, speed control is performed with the reference speed as a target speed Vt when the necessary steering angle estimated on the basis of the reference speed and the curvature of the route is equal to or less than the upper limit angle, and speed control is performed with a speed at which the steering angle is equal to or less than the upper limit value as a target speed Vt when the necessary steering angle exceeds the upper limit angle, and therefore it is possible to appropriately control the vehicle speed within a range in which the lateral acceleration is equal to or less than a certain value while preventing deviation from the target trajectory.

According to the first embodiment described above, a target speed Vt in the eyes-off state or the hands-off state is made lower than a target speed Vt in the eyes-on state or the hands-on state and therefore, even when the occupant is in an eyes-off state or a hands-off state and thus it takes time for the occupant to perform manual steering, it is possible to delay the progressing of the own-vehicle M and thus it is possible to secure time for the occupant to be ready for driving. As a result, it is possible to appropriately transfer the right to operate the own-vehicle M from the system to the occupant.

According to the first embodiment described above, the occupant is prompted to gaze forward or to grip the steering wheel in a steep curved road with a curvature equal to or greater than a predetermined value and therefore it is possible to appropriately transfer the right to operate the own-vehicle M from the system to the occupant.

According to the first embodiment described above, the second predetermined speed β which is subtracted from the provisional target speed Vr in the eyes-off state is made higher than the first predetermined speed α which is subtracted from the provisional target speed Vr in the eyes-on state and therefore it is possible to determine the target speed Vt on the basis of the time required for the occupant to be able to shift to manual driving. As a result, it is possible to appropriately transfer the right to operate the own-vehicle M from the system to the occupant.

According to the first embodiment described above, a target speed Vt in the hands-off state is made lower compared to that in the eyes-off state and therefore it is possible to further delay the progressing of the own-vehicle M in a situation in which it takes a long time for the occupant to be able to shift to manual driving. As a result, it is possible to more appropriately transfer the right to operate the own-vehicle M from the system to the occupant.

According to the first embodiment described above, when the necessary steering angle exceeds the upper limit angle, the occupant is notified that the speed is overspeed. Therefore, for example, the occupant can be made able to recognize that deceleration control performed before entering a curved road is the system's intended control.

Second Embodiment

A second embodiment will now be described. The second embodiment differs from the first embodiment in that, when an obstacle OB such as a fallen object is present in the way of a curved road and a target trajectory for avoiding the obstacle OB is generated, a target speed Vt is made lower than a reference speed of the route. Hereinafter, differences from the first embodiment will be mainly described and descriptions of functions or the like in common with the first embodiment will be omitted.

FIG. 12 is a diagram showing another exemplary scenario in which a branching event is activated. For example, when the external environment recognizer 121 has recognized that an obstacle OB is present on a predetermined route, the behavior plan generator 123 generates a target trajectory for avoiding the obstacle OB as shown in FIG. 12. More specifically, when an obstacle OB is present at a position biased to either the left or the right side from the center of the road, the behavior plan generator 123 generates a target trajectory (shown as a solid-line arrow in FIG. 12) such that the own-vehicle M passes through the side where the obstacle OB is not present.

At this time, when the side where the obstacle OB is not present is the inner side of the curved road, that is, when the turning radius of the own-vehicle M is reduced and thus there is a possibility that the own-vehicle M will travel along a trajectory as shown by a dashed-line arrow in FIG. 12, the behavior plan generator 123 makes the target speed Vt further lower since the curvature of the target trajectory is further increased, such that the lateral acceleration is equal to or less than a predetermined value while preventing deviation from the target trajectory for avoidance.

When the obstacle OB is recognized by the external environment recognizer 121 and thus a recognition result is displayed on the display device 30a or the like of the HMI 30 by an image or the like, the occupant who has viewed the recognition result may operate the steering wheel with an amount of operation equal to or greater than a threshold value and switch the driving mode from the automated driving mode to the manual driving mode and then perform steering control to avoid the obstacle OB. In this case, the behavior plan generator 123 generates a target trajectory with a target speed Vt which is lower than that before the recognition of the obstacle OB in advance. Thus, the travel controller 141 performs deceleration control until the driving mode is switched to the manual driving mode by the occupant's intention and therefore it is possible to delay the progressing of the own-vehicle M and thus it is possible to secure time for the occupant to be ready for driving.

According to the second embodiment described above, for example, when the own-vehicle M travels avoiding an obstacle OB on a curved road to a more inner side of the curve than an initially scheduled target trajectory, it is possible to delay the progressing of the own-vehicle M, thus securing time for the occupant to be ready for driving. For example, it may be assumed that there is a case in which actuators for performing steering control cannot perform their intended control when avoiding to the side where the lateral acceleration is greater. Assuming such a case, the target speed Vt is made smaller as the curvature of the target trajectory increases and therefore it is possible to earn time until the own-vehicle M deviates from the target trajectory and to appropriately transfer the right to operate the own-vehicle M from the system to the occupant.

Each of the embodiments described above can be expressed as follows.

A vehicle control system includes a storage configured to store a program and a processor configured to execute the program to acquire environmental information including information of a reference speed preset on a scheduled route on which an own-vehicle travels, to perform speed control and steering control of the own-vehicle on the basis of the acquired environmental information, and to perform the speed control with the reference speed as a target speed of the own-vehicle if a control index value regarding the steering control is equal to or less than an upper limit value when the own-vehicle travels on the scheduled route at the reference speed and to perform the speed control with a speed at which the control index value regarding the steering control is equal to or less than the upper limit value as the target speed of the own-vehicle if the control index value exceeds the upper limit value.

Although the mode for carrying out the present invention has been described above by way of embodiments, the present invention is not limited to these embodiments at all and various modifications and substitutions may be made without departing from the spirit of the present invention.

What is claimed is:

1. A vehicle control system comprising:
   an acquirer configured to acquire environmental information including information of a reference speed preset on a scheduled route on which an own-vehicle travels; and
   a travel controller configured to perform speed control and steering control of the own-vehicle on the basis of the environmental information acquired by the acquirer,
   wherein the travel controller is configured to perform the speed control with the reference speed as a target speed of the own-vehicle if a control index value regarding the steering control is equal to or less than an upper limit value when the own-vehicle travels on the scheduled route at the reference speed and to perform the speed control with a speed at which the control index value regarding the steering control is equal to or less than the upper limit value as the target speed of the own-vehicle if the control index value exceeds the upper limit value,
   the vehicle control system further comprising:
   a monitor configured to monitor an occupant of the own-vehicle based on an image of the occupant captured by a vehicle interior camera of the own-vehicle; and
   a detector configured to detect a state in which the occupant of the own-vehicle is operating an operator,
   wherein the travel controller is configured to determine the target speed of the own-vehicle based on both a monitoring result by the monitor and a detection result by the detector when the control index value exceeds the upper limit value.

2. The vehicle control system according to claim 1, wherein the acquirer is configured to acquire information regarding a curvature of the scheduled route as the environmental information, and
   the travel controller is configured to perform the speed control with the target speed that decreases as the curvature of the scheduled route indicated by the information acquired by the acquirer increases if the control index value regarding the steering control exceeds the upper limit value.

3. The vehicle control system according to claim 1,
   wherein the travel controller is configured to perform, if the control index value exceeds the upper limit value, the speed control with the target speed which is lower when a monitoring result of the monitor indicates that the occupant is not monitoring surroundings of the own-vehicle than when the monitoring result indicates that the occupant is monitoring surroundings of the own-vehicle.

4. The vehicle control system according to claim 3, wherein the travel controller is configured to generate a target trajectory, which is used as a reference when causing the own-vehicle to travel along the scheduled route, on the basis of a curvature of the scheduled route,
   the travel controller is configured to perform the steering control on the basis of a target steering angle corresponding to a curvature of the generated target trajectory, and
   the vehicle control system further comprises an output unit configured to output, when the curvature of the scheduled route is equal to or greater than a predetermined value or when the target steering angle is equal to or greater than a predetermined angle, information prompting the occupant to monitor surroundings of the own-vehicle if a monitoring result of the monitor indicates that the occupant is not monitoring surroundings of the own-vehicle.

5. The vehicle control system according to claim 1, further comprising a detector configured to detect a state in which an occupant of the own-vehicle is operating an operator,
   wherein the travel controller is configured to perform, if the control index value exceeds the upper limit value, the speed control with the target speed which is lower when a detection result of the detector indicates that the occupant is not operating the operator than when the detection result indicates that the occupant is operating the operator.

6. The vehicle control system according to claim 5, wherein the travel controller is configured to generate a target trajectory, which is used as a reference when causing the own-vehicle to travel along the scheduled route, on the basis of a curvature of the scheduled route,
   the travel controller is configured to perform the steering control on the basis of a target steering angle corresponding to a curvature of the generated target trajectory, and
   the vehicle control system further comprises an output unit configured to output, when the curvature of the scheduled route is equal to or greater than a predetermined value or when the target steering angle is equal to or greater than a predetermined angle, information prompting the occupant to operate the operator if a detection result of the detector indicates that the occupant is not operating the operator.

7. The vehicle control system according to claim 3,
   wherein the travel controller is configured to make the target speed lower when the occupant is not operating the operator than when the occupant is not monitoring surroundings of the own-vehicle.

8. The vehicle control system according to claim 1, further comprising an output unit configured to output information regarding speed change of the own-vehicle to an occupant of the own-vehicle when the travel controller performs the speed control with the target speed which is lower when the control index value exceeds the upper limit value than when the control index value does not exceed the upper limit value.

9. A vehicle control method comprising:
   an in-vehicle computer acquiring environmental information including information of a reference speed preset on a scheduled route on which an own-vehicle travels;
   performing speed control and steering control of the own-vehicle on the basis of the acquired environmental information;
   performing the speed control with the reference speed as a target speed of the own-vehicle if a control index value regarding the steering control is equal to or less than an upper limit value when the own-vehicle travels on the scheduled route at the reference speed and performing the speed control with a speed at which the control index value regarding the steering control is equal to or less than the upper limit value as the target speed of the own-vehicle if the control index value exceeds the upper limit value;

monitoring an occupant of the own-vehicle based on an image of the occupant captured by a vehicle interior camera of the own-vehicle;

detecting a state in which the occupant of the own-vehicle is operating an operator; and determining the target speed of the own-vehicle based on both a monitoring result of the occupant and a detection result of the state when the control index value exceeds the upper limit value.

* * * * *